United States Patent [19]

Samanta et al.

[11] 4,323,325
[45] * Apr. 6, 1982

[54] METHOD OF USING Si$_3$N$_4$·Y$_2$O$_3$·SiO$_2$ CERAMIC SYSTEM FOR MACHINE CAST IRON

[75] Inventors: Shyam K. Samanta, Ypsilanti; Krishnamoorthy Subramanian, Inkster; Andre Ezis, Grosse Ile, all of Mich.

[73] Assignee: Ford Motor Company, Dearborn, Mich.

[ * ] Notice: The portion of the term of this patent subsequent to Oct. 14, 1997, has been disclaimed.

[21] Appl. No.: 182,342

[22] Filed: Aug. 29, 1980

Related U.S. Application Data

[60] Continuation-in-part of Ser. No. 105,829, Dec. 20, 1979, Pat. No. 4,227,842, which is a continuation-in-part of Ser. No. 954,796, Oct. 25, 1978, abandoned, which is a division of Ser. No. 911,256, May 31, 1978, abandoned.

[51] Int. Cl.$^3$ .................. B32C 1/00; C04B 35/58; C04B 35/50
[52] U.S. Cl. .................. 409/131; 82/1 C; 51/308; 51/309; 407/119; 408/1 R; 501/97; 501/98; 501/152
[58] Field of Search .................. 409/131; 82/1 C; 106/73.2, 73.5; 51/308, 309; 408/1 R; 407/119; 501/97, 98, 152

[56] References Cited

U.S. PATENT DOCUMENTS

| | | | |
|---|---|---|---|
| 3,830,652 | 8/1974 | Gazze | 106/73.5 |
| 3,833,389 | 9/1974 | Komeya | 106/55 |
| 4,227,842 | 10/1980 | Samanta et al. | 106/73.2 |

Primary Examiner—Mark Bell
Attorney, Agent, or Firm—Joseph W. Malleck; Olin B. Johnson

[57] ABSTRACT

A process for machine cutting of cast iron with a shaped tool which is a ceramic having as constituent ingredients about 4 to about 12% by weight Y$_2$O$_3$ and a balance consisting essentially of Si$_3$N$_4$ and which has a density of at least 3.25 gm./cm$^3$.

10 Claims, 7 Drawing Figures

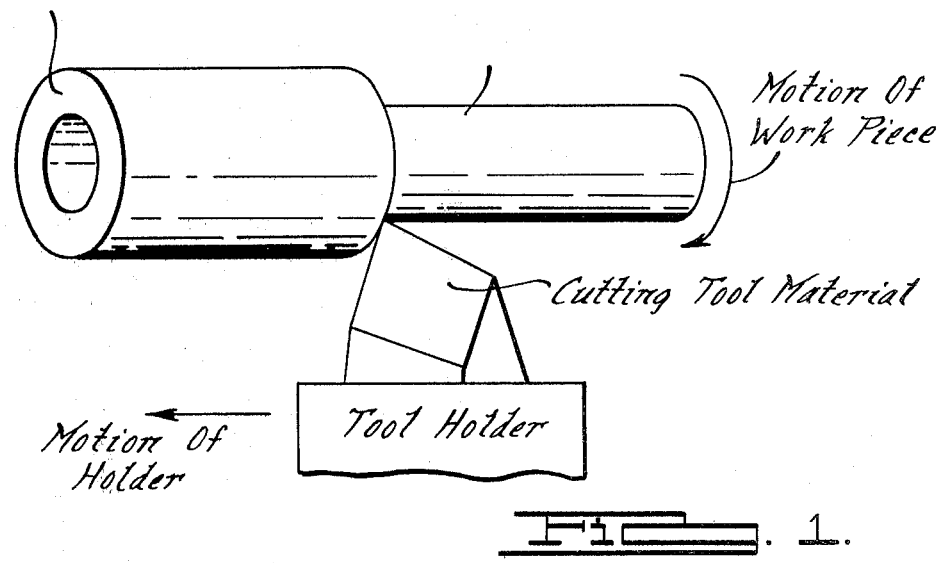
FIG. 1.
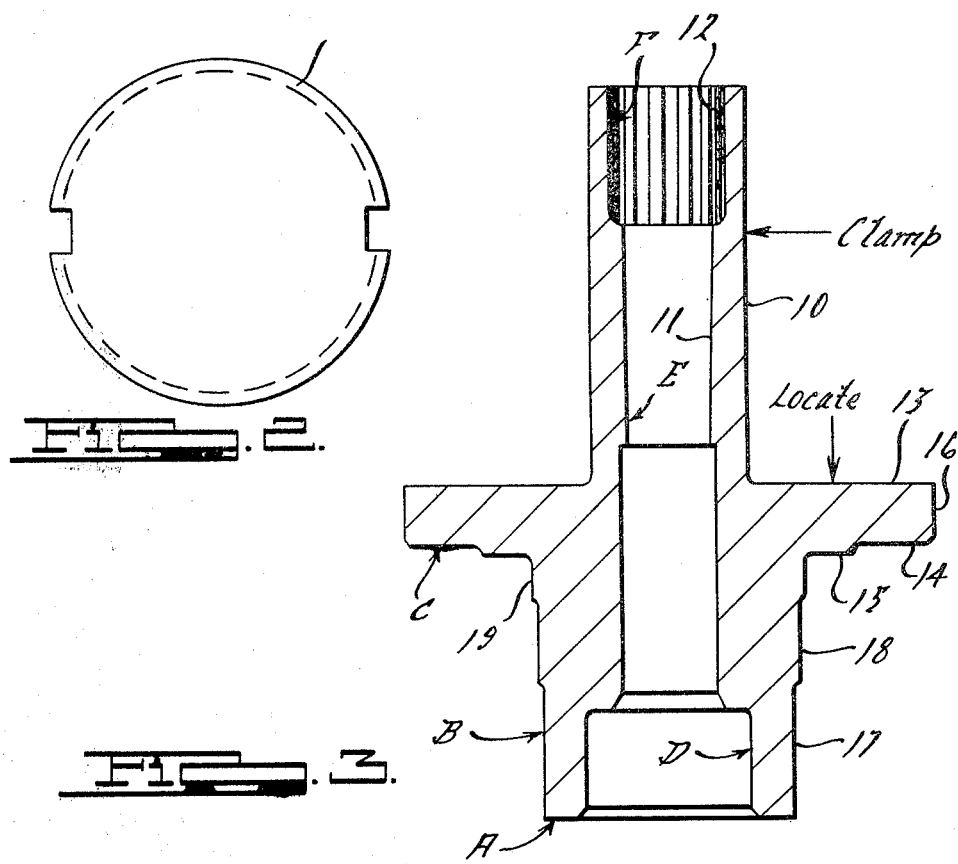
FIG. 2.
FIG. 3.

METHOD OF USING $Si_3N_3 \cdot 4_2O_3 \cdot SiO_2$ CERAMIC SYSTEM FOR MACHINE CAST IRON

RELATED APPLICATIONS

This application is a continuation-in-part of U.S. patent application Ser. No. 105,829 filed Dec. 20, 1979, now U.S. Pat. No. 4,227,842, which in turn is a continuation-in-part of U.S. patent application Ser. No. 954,796 filed Oct. 25, 1978, now abandoned, which in turn is a divisional application of U.S. patent application Ser. No. 911,256 filed May 31, 1978, now abandoned.

BACKGROUND OF THE INVENTION

Recently, ceramics composed principally of silicon nitride ($Si_3N_4$) have found significant use as ceramic components for machines or as vessel coatings. This material is known to have many good characteristics at high temperatures (1200°–1400° C.), e.g., good oxidation resistance, good mechanical strength, and good hardness.

The preferred method for making silicon nitride comprising ceramics of high density and high strength has been by a process known in the art as hot pressing. However, in spite of the use of hot pressing, the bend strength of simple $Si_3N_4$ has not been as high as desired at high temperatures. Accordingly, other avenues of strength improvement have been sought such as through the use of additives which operate as densification aids while not significantly impairing the creep resistance of the ceramic body at high temperatures. These added materials have included relatively large amounts of chromium oxide, zinc oxide, nickel oxide, titanium oxide, cerium oxide, magnesium oxide, yttrium oxide and others, ranging in excess of 20% (wt.) of the matrix material. Silicon nitride with these particular additives tends to form a structure having a strength level which does not usually exceed 50 KSI at high temperatures. In one instance (U.S. Pat. No. 3,830,652 to Gaza) the prior art did report strength levels in excess of 50 KSI. In this instance, the concern was for physical characteristics useful for turbine elements: hardness, oxidation resistance (inertness) and transverse rupture strength. Gaza explored metal oxide additives to a $Si_3N_4$ system which ranged in amounts related solely to machine element usage. The additions were added in amounts up to 20%.

However, commercial cutting tools used today and prepared from materials other than silicon nitride exhibit the same or better physical properties than the silicon nitride based materials which were the focus of Gaza's work. For example, commercial $Al_2O_3$ or TiC tools have excellent hardness at high temperatures. They also have high resistance to oxidation and have transverse rupture strengths at high temperatures which range up to 100,000 psi. Strength has heretofore been considered the most important feature of tools because of the necessity to withstand forces imposed on the tool material by the tool fixture and by the resistance of the stock material, particularly at heavy depths of cutting. These forces become unusually exaggerated when cutting ferrous material such as cast iron at high speeds and feeds. Without increased strength, it is believed by those skilled in the art that further improvements in tool life cannot be achieved. Since the strength level of $Si_3N_4$ is equal to or lower than commercial materials now available, it has been rejected as a tool material candidate with little hope of improving tool life.

In only one known instance has the art attempted to employ $Si_3N_4$ directly as a cutting tool material and this was for use only on hypereutectic aluminum alloys. This attempt is set forth in Japanese Pat. No. 49-113803 (Oct. 30, 1973) by Kazutaka Ohgo, appearing in Chemical Abstracts, Volume 84, 1976, page 286 (84:21440t). In this work, silicon nitride was sintered and metal oxide spinels were employed in solid solution in the silicon nitride matrix. The spinels were formed by a mixture of divalent and trivalent metal oxides (including magnesium oxide and $Y_2O_3$). However, the molar percentage of the spinel metal oxide in the material was taught to be 10–40%. The author experienced difficulty in obtaining good sintering density when the molar percentage fell below 10. The highest density achieved was 3.18 g/cm$^3$.

A two step method was used by Ohgo requiring first a heating of the metal oxide powders to 1300°–1600° C. for 3–10 hours to form the spinel. The spinel was pulverized and mixed with a silicon nitride powder, which in turn was sintered to form cutting tools. Only a quarternary system was employed involving $Si_3N_4$, $SiO_2$, MgO and $Y_2O_3$. This produced many secondary phases which weakened the physical characteristics, particularly strength, thermal conductivity, and increased the thermal coefficient of expansion. A loss of these physical characteristics make it most difficult to obtain even equivalent performance to commercially available tools when applied to a rigorous cutting environment such as interrupted cutting on cast iron.

The aluminum alloy cutting operation used by Ohgo was of very short duration (2 minutes) of continuous machining. This type of test, of course, did not investigate cutting applications where large forces are applied to the tool, did not investigate the elimination of spinel additives, did not investigate heavy cutting against rough surfaces such as cast iron, nor continuous cutting for periods of several hours or greater, nor did it explore intermittent, interrupted high speed cutting at speeds of 4000–5000 sfm at heavy feeds and depths of cutting. The demonstrated wear of 0.006–0.008 inches, in Ohgo's work, for 2 minutes of cutting time is highly excessive when compared to the goals of the present invention. Therefore, this work did not demonstrate that $Si_3N_4$ possessed sufficient characteristics to be used as a tool material on ferrous materials which apply large bend forces to the tool.

Moreover, the art has been possessed of sufficient knowledge in the making of $Si_3N_4$ with additives for many years; during this long term no effort was made to apply this material as a cutting tool against cast iron. This tends to support the contention of this invention that if tool life is dramatically increased for certain $Si_3N_4$ composites when used for machining cast iron, there must be some unobvious characteristics independent of strength that remained undiscovered to promote this new use. The attainable hardness level and general rigidity of the known silicon nitride composites have yet to be comparable to commercial cutting tools. Investigators have failed to perceive this interplay of physical characteristics. Known silicon nitride compositions, when used as a cutting tool against relatively rough surfaces such as cast iron, exhibit a failure mode under such circumstances that is typically due to thermal shock as opposed to the more desirable mode by wear.

SUMMARY OF THE INVENTION

This invention relates to a process for machine cutting of cast iron stock with a shaped ceramic cutting tool, said process comprising moving said shaped ceramic cutting tool relative to and in engagement with said cast iron stock to remove a cast iron chip. The shaped ceramic cutting tool is the densified and fused product of compacting and heating together about 4 to about 12%, preferably about 6 to about 10%, by weight $Y_2O_3$ with a balance (i.e., about 96 to about 88% by weight) consisting essentially of $Si_3N_4$ until said product has a density of at least about 3.25 gms/cm$^3$. As used herein, the term "consisting essentially of $Si_3N_4$" includes a coating of $SiO_2$ that forms on $Si_3N_4$ particles and milling media impurities, e.g. $Al_2O_3$, which result from sizing, blending and mixing $Y_2O_3$ and $Si_3N_4$.

It has been discovered that a correlation exists between a thermal shock parameter and promotion of prolonged life in $Si_3N_4$ materials when used as a machine cutting tool for cast iron. This parameter consists of $KS/\alpha E$ where K is thermal conductivity of the material, S is the modulus of rupture, $\alpha$ the coefficient of thermal expansion, and E is Young's modulus. E can be eliminated from the parameter since it remains substantially constant for the contemplated variation in ceramic chemistry which controls this parameter. This parameter at 1200° C. should be at least $26 \times 10^9$ (BTU-lbs)/[hr. (in.$^3$)] if significant improvement in tool life is to be obtained. It has been further discovered that a simple ternary ceramic system ($Si_3N_4.SiO_2.Y_2O_3$) with $SiO_2$ present as an inherent surface layer on $Si_3N_4$ serves as the proper mechanism for achieving the required thermal shock parameter. Such material should be processed to a hardness, using the Rockwell 45-N standard, of above about 85, preferably at least 86 and more preferably at least 88.

In a preferred embodiment, this ceramic exhibits a thermal shock parameter at 1200° C. which is at least $26 \times 10^9$ (BTU-lbs)/[hr. (in.$^3$)] and a thermal shock parameter at room temperature (20°-25° C.) which is at least $220 \times 10^9$ (BTU-lbs)/[hr. (in.$^3$)]; a physical strength (as measured in a 4-point bend test) which is at least 70,000 psi at 700° C., a hardness level which is at least 86 using the Rockwell 45-N standard, a density of at least 3.25 g/cm$^3$, a coefficient of thermal expansion which is no greater than $1.88 \times 10^{-6}$ in./in./°F. at 1200° C., a thermal conductivity level of at least 0.727 BTU/hr-./in./°F. at 1200° C., and a modulus of elasticity no greater than $55.3 \times 10^6$ psi. Further, the processing is preferably regulated to avoid the presence of a spinel oxide and to insure formation of a liquid phase effective to form a highly refractory oxide, oxynitride and/or silicate residing solely in the grain boundaries of the body.

In the preferred method of preparation of a shaped cutting tool, the tool material is densified from a powder mixture of about 4 to about 12, preferably about 6 to about 10, % by weight $Y_2O_3$ and a balance (i.e., about 96 to about 88% by weight) consisting essentially of $Si_3N_4$ by hot pressing at a predetermined pressure, the pressure being maintained continuously during heating at an ultimate pressing temperature of about 1650° C. to about 1775° C., advantageously about 1700° C. to about 1750° C., until substantially full density is obtained, i.e., a density of at least about 3.25 g/cm$^3$.

It is advantageous to carry out the hot pressing at a pressure of about 3 to about 7, preferably about 3.8 to about 6.5, ksi for about 1 to about 8 hours to effect a stable refractory secondary phase in the grain boundaries of the $Si_3N_4$ body.

This hot pressed ceramic is shaped into a ceramic cutting tool for continuous or interrupted machine cutting of cast iron stock in conventional machine cutting operations, e.g., milling, turning, boring and other shear cutting modes. The term "milling" is used here in the broad meaning of such term as it applies to machine cutting of cast iron. This meaning is consistent with that portion of the definition of the verb "mill" which relates to metal cutting as defined by Webster's Third New International Dictionary (unabridged), copyright 1966 by G. C. Merriam Co., Publishers, Springfield, Mass., U.S.A., at page 1434, to-wit: a machine cutting of metal made in a making, shaping, dressing or finishing operation or process, and is not meant to distinguish between species of conventional metal cutting machines such as planars wherein the workpiece moves longitudinally below a tool holder that moves in a vertical plane and so-called milling machines wherein the workpiece is stationary and the tool holder moves vertically and horizontally to selected spots for chip removal from the surface of the metal stock. The term "chip" as used herein means that portion of the cast iron stock that is severed by shearing action of the tool as it moves relative to and against the cast iron stock.

Other processes are available for making $Si_3N_4.SiO_2.Y_2O_3$ ceramics with a density and accompanying physical properties within the scope suitable for use in this invention.

In one such process, a reaction bonded silicon nitride article containing $Y_2O_3$ in the range hereinbefore set forth is densified by enclosing such article in a chamber which also contains a mixture of silicon nitride powder and yttrium oxide powder and subjecting both to a nitrogen gas pressure sufficient to prohibit a significant volatilization of silicon nitride at a sintering temperature. The reaction bonded silicon nitride article, the powder mixture and the nitrogen gas associated therewith are heated to a temperature above 1700° C. for a time sufficient to permit sintering of the article whereby the strength of the reaction bonded silicon nitride article is increased. This process is the subject of a pending U.S. patent application Ser. No. 078,129, now U.S. Pat. No. 4,285,895 by John A. Mangels et al. Application Ser. No. 078,129 is incorporated herein and made a part hereof by reference.

Ceramics of the same percentage composition range suitable for use in this invention and of even higher densities than are achievable with the previously discussed sintering process can be prepared in a manner similar to the manner recited immediately above except that a two-stage sintering process is employed. In this process, the reaction bonded silicon nitride article is initially sintered at low pressure, e.g. 1 atmosphere, and at a first temperature, e.g. 1875° C., until a condition of closed porosity is obtained. At this point, the pressure of the nitrogen gas is increased markedly, e.g. to 20 atmospheres and the temperature increased to 1925° C. until sintering is complete. This process is the subject of a pending U.S. patent application Ser. No. 182,351 by John A. Mangels and entitled "A Method of Densifying An Article Formed of Reaction Bonded Silicon Nitride." This patent application, application Ser. No. 182,351, is incorporated herein and made a part hereof by reference.

The silicon nitride particles or reaction bonded silicon nitride article with which this process is started may be prepared by a plurality of methods. One such method is initiated by first placing silicon particles in an enclosed furnace and heating. A gaseous mixture of nitrogen and hydrogen containing not more than about 6% hydrogen by volume is introduced to fill the furnace. Thereafter, this charge is heated to a temperature of about 900° C. to about 1000° C. at which time the nitrogen starts to react with the silicon in furnace. Thereafter, the enclosed furnace is demand filled with a nitriding gas mixture consisting essentially of about 1 to about 10% by volume helium and about 99 to about 90% by volume nitrogen. The furnace is maintained at a nitriding temperature and the demand filling of the furnace chamber is continued until the nitriding operation is terminated. This process is the subject of a pending U.S. patent application Ser. No. 054,214 by John A. Mangels. Application Ser. No. 054,214, now U.S. Pat. No. 4,235,857 is incorporated herein by reference and made a part hereof. Silicon nitride powder can also be made by this process.

Machine cutting with the preferred embodiments of this tool can be carried out at a mass removal rate substantially exceeding 8.6 in.$^3$/min. for 20 minutes with tool wear not exceeding 0.01 inches and no evidence of thermal cracking. The cutting conditions preferably exceed 1000 sfm, 0.1 inch depth and 0.02 inch feed.

DESCRIPTION OF THE DRAWINGS

FIG. 1 is a perspective view of the work stock employed in a first set of laboratory cutting operations requiring continuous cutting simulation;

FIG. 2 is an end view of a work stock similar to FIG. 1 illustrating the mode to simulate interrupted cutting;

FIG. 3 is central sectional view of a stator support casting used as the stock material for production machining examples;

FIG. 4 depicts the front face side and FIG. 5 depicts the rear spindle side;

DETAILED DESCRIPTION

Figure 4:
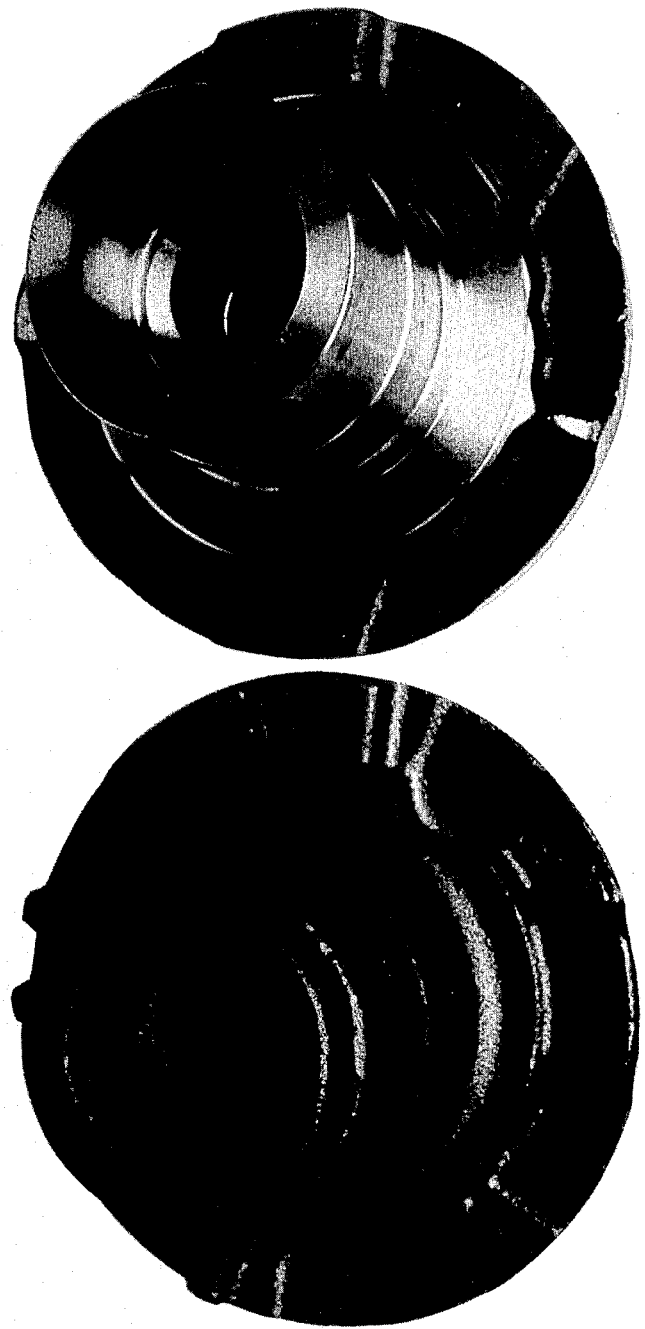
FIGS. 4 and 5 are before machining and after machining photographs of the actual casting of FIG. 3.

The tendency toward higher speeds and feeds to achieve lower production costs and higher productivity imposes an ever increasing demand for greater wear life on cutting tools. The temperature rise at the tool tips at these speeds and feeds is very high. Tool materials have to be inert at such working temperatures and their dynamic properties have to be superior to those of existing tool materials.

In accordance with this invention, it has been discovered that $Si_3N_4$, when combined with controlled amounts of certain metal oxides in a narrow volume fraction range, then hot pressed under controlled temperature, pressure and time conditions, will produce a cutting tool composition for a simple ternary system ($Si_3N_4\cdot SiO_2\cdot Y_2O_3$). This composition can be used at high speeds and heavy feed on cast iron and will exhibit high wear resistance and will fail by a mode of gradual wear, rather than thermal fatigue or catashopic failure.

The cutting tool formulation meets the needs of a specific set of cutting conditions created by working on cast iron. The tip temperature of the tool will experience a temperature typically in the range of 600°–800° C. This temperature factor is important since it is high enough to create thermal shock sites in portions of the tool, but not high enough to create a serious oxidation erosion problem. When machining cast iron, the chip easily fragments keeping any hot chip normally away from the tool tip.

Due to the resistance of cast iron to cutting, large fixture forces must be applied to the tool to move it through the stock material. Moreover, the mass removal rates required in many cutting operations on cast iron is considerably greater than used with other stock materials. This necessitates a strong tool material with respect to transverse rupture strength. Tool designers consider this latter aspect the most important consideration with respect to evaluating the success of a new tool material.

The three virtues normally recognized of $Si_3N_4$ would not suggest to one skilled in the art that it would be a successful candidate for machining cast iron. Its transverse rupture strength at high temperature rarely exceeded 50,000 psi (while commercial tools regularly experienced strength levels of 100,000–200,000 psi); its high oxidation resistance was not critically needed; and its good hardness at high temperature was easily exceeded by the hardness of commercially available silicon carbide tools.

The present invention recognized for the first time the role played by thermal shock resistance factors, namely, the coefficient of thermal expansion ($\alpha$) and thermal conductivity (K) related to the modulus of rupture (S). This is defined herein by the expression $KS/\alpha E$ where E is Young's modulus and can be eliminated because it remains substantially constant under varying cutting conditions and material variations. By maintaining this thermal shock parameter above $26 \times 10^9$ (BTU-lbs)/[hr. (in.$^3$)], it has been determined that a significant increase in wear life can be achieved on cast iron. It is difficult to theorize why this phenomenon takes place, but it may be due to the greater structural stability that is achieved by the ceramic at 700° C. when generated heat is quickly conducted away preventing a large temperature gradient in the tool which leads to cracking if the material has an undesirable coefficient of thermal expansion; this may more readily be experienced when the tool tip is slightly cooled by intermittent or interrupted cutting.

A preferred method for making such a cutting tool is as follows:

(1) A first powder of substantially alpha phase silicon nitride is prepared having less than 1.0% cation impurities (excluding free silicon), less than 1% free silicon, and less than 0.7% by weight oxygen.

(2) A second powder of $Y_2O_3$ is selected. $Y_2O_3$ is characterized by a large atom size and the affinity to form a liquid phase which solidifies as a highly refractory secondary phase residing solely within the grain boundaries of the matrix. It is important to avoid the formation of spinels which will produce weaker secondary phases.

(3) The first and second powders are blended and mixed in a prescribed proportion, preferably by a milling machine which may employ milling media constituted of $Al_2O_3$, WC, W, or TiC. The second powder should have a weight percent of 4–12% of mixture, except for impurities due to the milling media.

(4) The powder mixture is heated to a temperature level of 1700°–1750° C. for a period of 3–8 hours under a pressure of 3,800–6,500 psi, and allowed to cool at an average rate of 100°/hr. The hot pressed compact will exhibit substantially complete Beta phase silicon nitride.

The resulting product exhibits the following combination of physical characteristics:

(a) a thermal shock parameter at 1200° C. of at least $26 \times 10^9$ (BTU-lbs)/[hr. (in.$^3$)];

(b) a transverse rupture strength at 1200° C. (in 4-point bending) of at least 67,000 psi;

(c) a hardness level of at least 86 Rockwell 45-N;

(d) a measured density of at least 3.25 g/cm$^3$;

(e) a wear life characterized by measured wear of no greater than 0.010" after one hour of continuous cutting of cast iron at a mass removal rate of at least 25 in$^3$/min. or mechanical failure under cutting conditions prescribed by at least 2000 feet per minute with a depth of cut of at least 0.06 inches and a rate of feed of at least 0.012 inches per IPR;

(f) the absence of tool failure by fracture or chipping.

EXAMPLE I

A sample cutting tool material (identified as Sample 1) was prepared employing hot pressed silicon nitride with 7.47 wt. percent Y$_2$O$_3$ (8% Y$_2$O$_3$ was added as a powder to a powder having 85% alpha phase Si$_3$N$_4$); the powder mixture was hot pressed at a temperature of 1740° C. under 6500 psi ($9.55 \times 10^6$ kilogram/cm$^2$) for a period of 6½ hours. Although all samples in this example were pressed at 6500 psi, similar successful machining properties can be achieved with pressures as low as 3800 psi. The pieces of hot pressed material were ground to a tool geometry of SNG 434 and the edges were prepared with 0.006"×30° K. land (chamfer). See "Identification System for Index Inserts for Cutting Tools," ANSI (American National Standards Institute) B94-94.4, published by American Society of Mechanical Engineers, 1976. Each of the cutting tools prepared from this material were subjected to a cutting sequence on a simple cylindrical cast iron casting which varied between continuous, intermittent and interrupted.

As shown in FIG. 1, the continuous cutting consisted of generating cylindrical surface 10 at a prescribed speed, feed and depth of cut. Due to the expanded length of the cylinder 11, the tool tip experiences a relatively constant high temperature for the duration of the pass. Intermittent cutting consisted of withdrawing the tool intermittently along a longitudinal pass. Interrupted cutting consisted of passing the tool circumferentially about the cylinder along a path 12 (as shown in FIG. 2) which path encounters the previously cut longitudinal grooves. The latter provides repeated impact for the tool.

Each type of cutting style imposes a different thermal condition on the tool which affects tool life in different ways. Other tool material samples were similarly prepared with different chemistries, as shown in Table I, along with their resultant physical properties.

The cutting operation for all these samples was carried out in a laboratory environment at a variety of speeds and varying feed rates at a constant depth of cut; the tool geometry was varied only in the corner configuration as indicated. The wear in inches was measured for specific period of time. The results of such cutting are shown in Table II. None of the tools were used to full life; the cutting time was terminated when a significant increase in tool life was perceived. Five minutes, under high cutting speeds (3,000–4,000 sfm) was deemed an unusually high increase in life when compared to commercial tools which typically fail after one minute.

It is believed that optimization of the thermal shock parameter of Si$_3$N$_4$ under extreme temperature conditions has led to this increase in tool life. The ability to have a stable structure at 600°–800° C. temperature while under severe stress along with the ability to effectively conduct away heat preventing a loss in high temperature strength provides the basis for this life improvement. These physical characteristics are critically affected by the compositional phase of the Si$_3$N$_4$ composite. It is most important that the selected additives form a highly stable refractory oxynitride, oxide and/or silicate which resides totally in the grain boundary of the body.

EXAMPLE II

Figure 5:
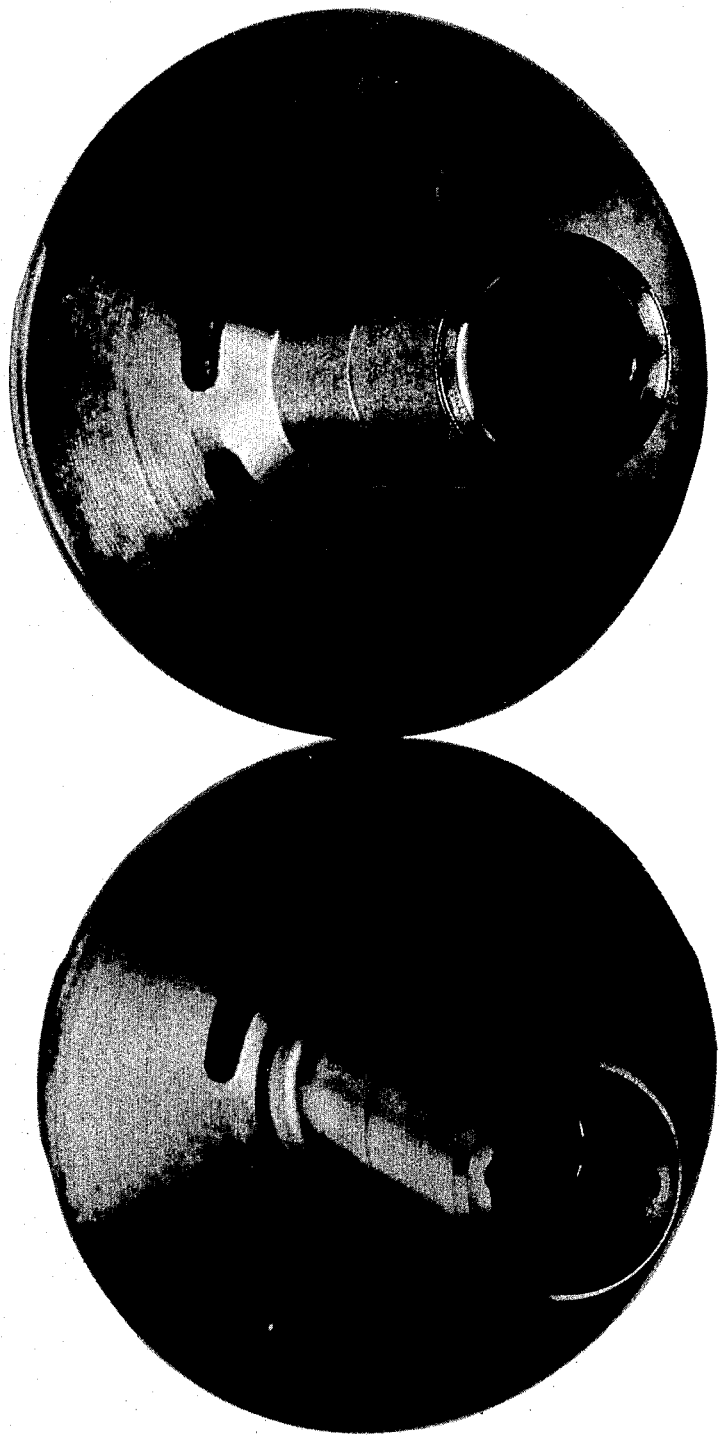

Substantially the same cutting tool materials, prepared as indicated from Example I, were prepared for cutting use in a production environment with actual production machines at Ford Motor Company's machining plants. The casting to be machined was a difficult production vehicle casting (stator support) in some cases and an engine block in others; the stator support is shown in FIGS. 3, 4 and 5. For the stator support, continuous cutting was experienced at surfaces B and D, intermittent cutting at surface A, and interrupted cutting at surfaces C and F (see FIG. 4).

These sample materials were run under a variety of cutting conditions as set forth in Table III. All tool materials were run to failure which is measured by the number of pieces produced up to that failure event. Failure herein is defined (as regularly as accepted in the industry) to mean loss of workpiece tolerance or failure by fracture or chipping.

From the data in Tables II and III, we have discovered that controlled processing of Si$_3$N$_4$ with Y$_2$O$_3$ provides the kind of thermal shock parameter that leads to longer tool life when machining cast iron at large mass removal rates or high speed. These metal oxides operate upon the controlled free silica to form a highly stable refractory silicate which resides totally in the grain boundaries of the Si$_3$N$_4$ body.

Table III proceeds from lower cutting speeds to higher speeds with comparative materials grouped adjacent each other. For each comparison the inventive samples render significant increases in tool life.

The inventive materials perform 3–8 times better than the current commercial tools. In finish machining of the front end of an engine block, the number of blocks milled were 2100 pieces per corner with a depth of cut of 0.065 inch. Whereas using commercially available ceramics with half of that feed rate, the number is 600 pieces. The inventive material will provide (a) increased production at current cutting conditions, (b) increased production capacity at higher cutting speeds and feeds, (c) savings in tool material cost, (d) reduction in tool change downtime, and (e) increased production capacity leading to free machine time for preventive maintenance.

Figure 6:
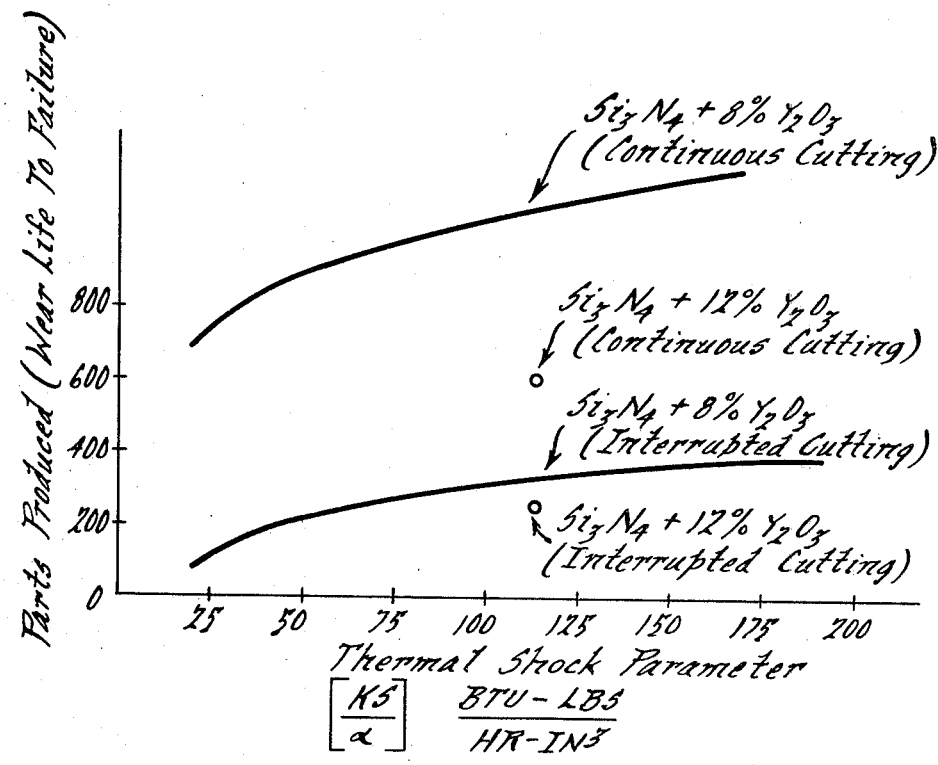
FIG. 6 is a graphical illustration of wear life to failure vs. thermal shock parameter employing the invention.

To obtain at least a four-fold increase in tool life over commercially available tool materials the Si$_3$N$_4$.SiO$_2$.Y$_2$O$_3$ ternary system must be employed with Y$_2$O$_3$ controlled to a limit of 7–9%. In this manner the thermal shock parameters can be optimized at either continuous or interrupted cutting conditions. FIG. 6 and Table IV portrays the role played by the thermal shock parameter.

Figure 7:
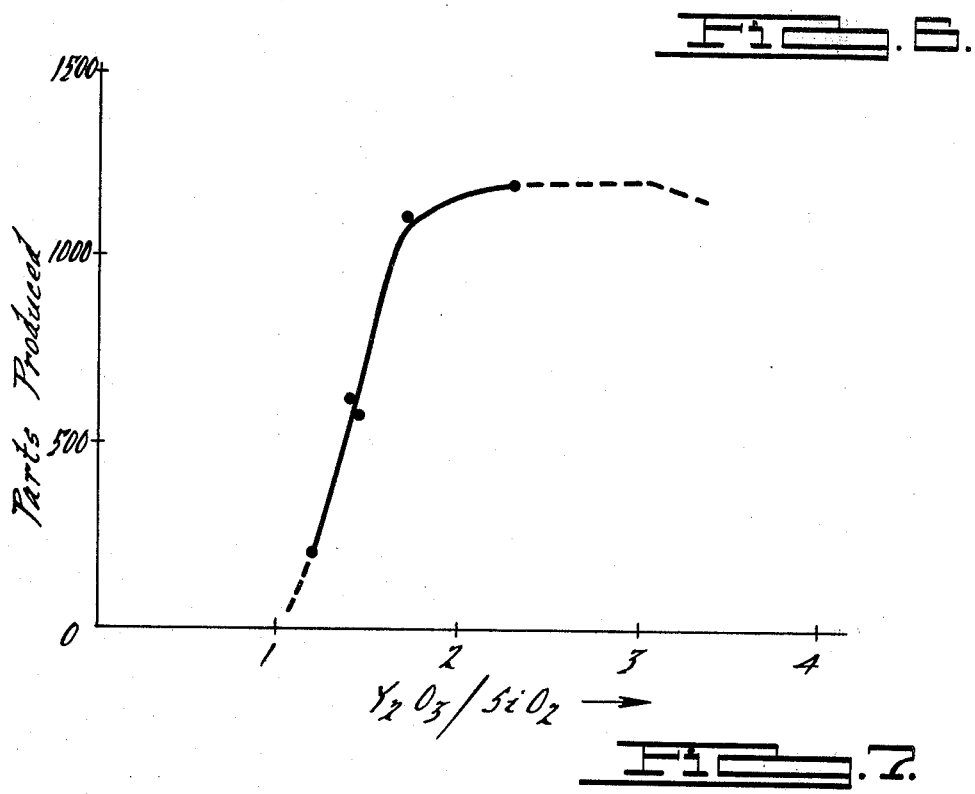
FIG. 7 is a graphical illustration of wear life to failure vs. $Y_2O_3/SiO_2$ ratio.

Additionally, $Y_2O_3/SiO_2$ weight ratio should exceed 1.60. The influences of the $Y_2O_3/SiO_2$ ratio is portrayed in FIG. 7 and Table V.

TABLE I

| Material Sample | S, Transverse Rupture Strength (4-Point Bending),KSI | | Hardness Room Temp. | Density gm/cm³ | α, Coefficient of Thermal Expansion, $\times 10^{-6}$in/in °F. | | K, Thermal Conductivity, BTU/Hr in °F. | | $\frac{KS}{\alpha}$, Thermal Shock Factor BTU-lbs. Hr (in³) | | E(Young's Modulus $10^6$ psi |
|---|---|---|---|---|---|---|---|---|---|---|---|
| | Room Temp. | 1200° C. | Rockwell 45-N | | Room Temp. | 1200° C. | Room Temp. | 1200° C. | Room Temp. | 1200° C. | |
| Sample No. 1 $Si_3N_4$ + 8% $Y_2O_3$ | 103.6 | 105.7 | 87.6 | 3.4 | 0.87 | 1.87 | 3.23 | 3.23 | 179 | 182 | 53 |
| Sample No. 2 $Si_3N_4$ + 11–12% $Y_2O_3$ | 115 | 70 | 87.0 | 3.398 | 1.5 | 2.7 | 4.4 | 4.4 | 337 | 114 | 51 |
| Sample No. 3 $Si_3N_4$ + 5% MgO | 85 | 67 | 86.3 | 3.272 | .84 | 1.84 | 1.917 | .727 | 194 | 26 | 55.3 |
| Sample No. 4 $Si_3N_4$ + 1% MgO | 129 | 87.4 | 89.2 | 3.25 | .74 | 1.74 | 1.917 | .727 | 334 | 36 | 54.7 |
| Sample No. 5 $Si_3N_4$ + 15% (88% ZrO + 12% $Y_2O_3$ known as Zytrite) | Substantially equivalent properties to Sample 2. | | | | | | | | | | |
| Sample No. 6 $Si_3N_4$ + 15 (88% ZrO + 12% $Y_2O_3$ + 1.5 Fe impurities known as modified Zytrite) | Substantially equivalent properties to Sample 2. | | | | | | | | | | |
| Sample No. 7 SiC (Prior Art) | | 93 | 91.5 | 3.29 | 1.53 | 2.57 | 4.09 | 1.71 | | | |
| Sample No. 8 $Al_2O_3$ (Prior Art) | 75 | 30 | 90.14 | 4.252 | 4.4 | 5.7 | 1.9 | 3 | 324 | 16 | 67 |

TABLE II

| Sample No. | Corner Configuration Number | Cutting Condition | | | Mass of Material Removed in³/min | Time (MIN) or (min-sec.) | Tool Wear (Inches) | | Thermal and Mechanical Cracks |
|---|---|---|---|---|---|---|---|---|---|
| | | Speed (sfm) | Feed (ipr) | Depth of cut (in.) | | | Flank | Crater | |
| Continuous Cutting | | | | | | | | | |
| 1A | 1 | 4000 | .010 | .100 | 48 | 5.2 | none | none | NIL |
| 1B | 3 | 3000 | .020 | .100 | 72 | 5.7 | none | none | NIL |
| 1C | 1 | 3000 | .010 | .100 | 36 | 17.5 | none | none | NIL |
| 1D | 1 | 2000 | .0111 | .100 | 26.4 | 43.7 | none | none | NIL |
| 1E | 3 | 1000 | .0222 | .100 | 26.4 | 26.8 | none | none | NIL |
| 1F | 2 | 750 | .029 | .100 | 26.4 | 11.7 | none | none | NIL |
| 1G | 1 | 500 | .044 | .100 | 26.4 | 10.5 | none | none | NIL |
| 1H | 2 | 333 | .066 | .100 | 26.4 | 1.9 | none | none | Mechanical Fracture |
| 1I | 3 | 2000 | .011 | .100 | — | 21.0 | .015" | none | NIL |
| Intermittant Cutting | | | | | | | | | |
| 1K | 2 | 1000 | .011 | .100 | 13.2 | 2.3 | none | none | NIL |
| 1L | 5 | 750 | .029 | .100 | 26.4 | 1.1 | none | none | NIL |
| 1M | 6 | 750 | .044 | .100 | 39.6 | 0.6 | none | none | NIL |
| 1N | 7 | 500 | .011 | .100 | 6.6 | 4.1 | none | none | NIL |
| 1O | 4 | 2000 | .011 | .100 | 26.4 | 8.8 | none | none | NIL |
| 1P | 8 | 1000 | .022 | .100 | 26.4 | 7.7 | none | none | NIL |
| Interrupted Cutting | | | | | | | | | |
| 1Q | 6 | 1000 | .0111 | .100 | 13.2 | 3.7 | .0016" | NIL | NIL |
| 1R | 8 | 1000 | .0222 | .100 | 26.4 | 10.0 | .0013 | NIL | NIL |
| 1S | 7 | 2000 | .0111 | .100 | 26.4 | 10.5 | .0021 | NIL | NIL |
| Continuous Cutting | | | | | | | | | |
| 3A | 1(Trial 1) | 2000 | .0111 | .100 | 26.4 | 2.05 | .0055 | — | NIL |
| 3B | 3(Trial 2) | 2000 | .0111 | .100 | 26.4 | 9.95 | .0015" | — | NIL |
| 3C | 4 | 1000 | .0222 | .100 | 26.4 | 9.92 | .0018 | — | NIL |
| Interrupted Cutting | | | | | | | | | |
| 3D | 4 | 1000 | .0222 | .100 | 26.4 | 10.00 | | — | NIL |
| Continuous Cutting | | | | | | | | | |
| 4A | 1 | 2000 | .0111 | .100 | 26.4 | 9.65 | .002 | — | NIL |
| 4B | 2 | 1000 | .0222 | .100 | 26.4 | 10.5 | .001 | — | NIL |
| 5A | 2(Trial 1) | 2000 | .0111 | .100 | 26.4 | 9.82 | .0116 | — | NIL |
| 5B | 3(Trial 2) | 2000 | .0111 | .100 | 26.4 | 10.00 | .002 | — | NIL |
| 5C | 1 | 1000 | .0222 | .100 | 26.4 | 9.88 | .0019 | — | NIL |

TABLE II-continued

| | | Cutting Condition | | | | | | | |
|---|---|---|---|---|---|---|---|---|---|
| Sample No. | Corner Configuration Number | Speed (sfm) | Feed (ipr) | Depth of cut (in.) | Mass of Material Removed in$^3$/min | Time (MIN) or (min-sec.) | Tool Wear (Inches) Flank | Crater | Thermal and Mechanical Cracks |
| 6A | (Trial 1) | 2000 | .011 | .100 | 26.4 | 10.00 | .005 | — | NIL |
| 6B | (Trial 2) | 2000 | .011 | .100 | 26.4 | 5.15 | .002 | — | NIL |
| 6C | | 1000 | .022 | .100 | 26.4 | 10.10 | .002 | — | NIL |
| Continuous Cutting | | | | | | | | | |
| 7A | | 2000 | .0111 | .10 | 26.4 | 0.02" | Faction by Fracture | | Mechanical Fracture |
| 7B | | 1000 | .0222 | .10 | 26.4 | 0'15" | Faction by Fracture | | Mechanical Fracture |
| 7C | | 1000 | .0111 | .100 | 13.2 | 0'11" | Faction by Fracture | | Mechanical Fracture |

TABLE III

| Sample | Material | Cutting Operation | Tool Geometry | Cutting Conditions Speed (sfm) | Feed (ipr) | Depth of Cut (inches) | Work Pieces Produced before Failure |
|---|---|---|---|---|---|---|---|
| 1 | Hot Pressed Si$_3$N$_4$ + 8% Y$_2$O$_3$ | Broaching of Engine block Surface | SNG 636 | 150 | — | .02 | 1910 |
| 10 | (Prior Art Tool) WC | Broaching of Engine block Surface | " | " | — | " | 800 |
| 1 | Hot Pressed Si$_3$N$_4$ + 8% Y$_2$O$_3$ | Rough facing of Surface A (intermittent cutting) | SNG 434 | 496 | .016 | .125–.250 | 1200 |
| | Hot Pressed Si$_3$N$_4$ + 1% MgO | Rough facing of Surface A (intermittent cutting) | " | " | " | .125–.250 | 800 |
| | Hot Pressed Si N + 5% MgO | Rough facing of Surface A (intermittent cutting) | " | " | " | .125–.250 | 740 |
| | (Prior Art Tool) SiC Base tool coated with Al$_2$O$_3$ | Rough facing of Surface A (intermittent cutting) | " | " | " | .125–.250 | 150 |
| 1 | Hot Pressed Si$_3$N$_4$ + 8% Y$_2$O$_3$ | Semi finish and finish bore surface E (continuous cutting) | TPG 322 | 516 | .012–.006 | .025 | 1000 |
| | (Prior Art Tool) WC | Semi finish and finish bore surface E (continuous cutting) | " | " | .012–.006 | " | 250 |
| 1 | Hot Pressed Si$_3$N$_4$ + 8% Y$_2$O$_3$ | Semi-finish and finish bore surface F (spline hole) Interrupted cutting) | " | " | .0135–.006 | " | 320 |
| 1 | Hot Pressed Si$_3$N$_4$ + 8% Y$_2$O$_3$ | Rough face of Surface C (interrupted cutting | TNG 434 | 965–496 | .012 | .093 | 420 |
| | Hot Pressed Si$_3$N$_4$ + 1% MgO | Rough face of Surface C (interrupted cutting | " | 965–496 | " | " | 140 |
| | (Prior Art Tool) SiC base tool coated with Al$_2$O$_3$ | Rough face of Surface C (interrupted cutting | " | 965–496 | " | " | 50 |
| 1 | Hot Pressed Si$_3$N$_4$ + 8% Y$_2$O$_3$ | Rough turning of outside diameter on surface B (continuous cutting) | " | 998 | .014 | .0625 | 420 |
| | (Prior Art Tool) SiC base tool | Rough turning of outside diameter on sur- | " | " | " | " | 50 |

TABLE III-continued

| Sample | Material | Cutting Operation | Tool Geometry | Cutting Conditions Speed (sfm) | Feed (ipr) | Depth of Cut (inches) | Work Pieces Produced before Failure |
|---|---|---|---|---|---|---|---|
| | coated with Al₂O₃ | face B (continuous cutting) | | | | | |
| 1 | Hot Pressed Si₃N₄ + 8% Y₂O₃ | Rough boring of inside diameter on surface D (continuous cutting) | " | 1026 674 | .0189 to .0039 | " | 157 |
| | (Prior Art Tool) SiC base tool, coated with Al₂O₃ | Rough boring of inside diameter on surface D (continuous cutting) | " | 1026 674 | .0189 to .0039 | " | 50 |
| 1 | Hot Pressed Si₃N₄ + 8% Y₂O₃ | Finish mill end of block (intermittent cutting) | " | 1026 674 | .0043 (ipt) | .065 | 2100 |
| | Al₂O₃ base +5% TiN | Finish mill end of block (intermittent cutting) | " | 1026 674 | .0043 (ipt) | " | 400 |

TABLE IV

| Sample No. | Thermal Shock Parameter $\frac{KS}{\alpha}$ Room Temp. | High Temp. (1200° C.) | Parts Produced (Continuous Cutting) End Facing (A) | (Interrupted Cutting) Flange Machine (B) |
|---|---|---|---|---|
| Si₃N₄ + 8% Y₂O₃ | 179 | 182 | 1200 | 420 |
| Si₃N₄ + 1% MgO | 334 | 36 | 800 | 140 |
| Si₃N₄ + 5% MgO | 220 | 26 | 740 | — |
| Si₃N₄ + 12% Y₂O₃ | 114 | | 600 | 210 |
| Al₂O₃ | 16 | | 200 | Fails by thermal cracking at outset |

K = Thermal Conductivity, BTU/Hr in °F.
S = Modulus of Rupture, KSI, (4-point bending).
α = Coefficient of Thermal Expansion, × 10⁻⁶ in/in °F.

TABLE V

| Material | Cutting Condition Speed (sfm) | Feed (ipr) | Depth of Cut (in) | No. of Work Pieces Produced |
|---|---|---|---|---|
| Hot Pressed Si₃N₄ with 8% Y₂O₃; $\frac{Y_2O_3}{SiO_2}$ = 2.30 | 496 | .016 | .125 to .250" | 1200 |
| Same; $\frac{Y_2O_3}{SiO_2}$ = 1.7 | " | " | " | 1112 |
| Same $\frac{Y_2O_3}{SiO_2}$ = 1.41 | " | " | " | 620 |
| Same; $\frac{Y_2O_3}{SiO_2}$ = 1.18 | " | " | " | 200 |
| Hot Pressed Si₃N₄ with 11% Y₂O₃; $\frac{Y_2O_3}{SiO_2}$ = 1.45 | " | " | " | 580 |

We claim:

1. A process for machine cutting of cast iron stock with a shaped ceramic cutting tool, comprising moving said shaped ceramic cutting tool relative to and in engagement with said cast iron stock to remove a cast iron chip, said ceramic cutting tool being the densified and fused product of compacting and heating together about 4 to about 12% by weight $Y_2O_3$ with a balance (about 96 to about 88% by weight) consisting essentially of $Si_3N_4$ until said product has a density of at least 3.25 gms./cm³.

2. A process for machine cutting of cast iron stock with a shaped ceramic cutting tool, comprising moving said shaped ceramic cutting tool relative to and in engagement with said cast iron stock to remove a cast iron chip, said ceramic cutting tool being the densified and fused product of compacting and heating together about 4 to about 12% by weight $Y_2O_3$ with a balance (96 to 88% by weight) consisting essentially of $Si_3N_4$ until said product has a density of at least 3.25 gms./cm³ and a thermal shock parameter determined by the formula $$KS/\alpha E$$

wherein K is the thermal conductivity of the material, S is the modulus of rupture, α is the coefficient of thermal expansion and E is Young's modulus, said thermal shock parameter at 1200° C. being at least $26 \times 10^9$ (BTU-lbs.)[hr. (in.³)].

3. A process for machine cutting of cast iron stock with a shaped ceramic cutting tool, comprising moving said shaped ceramic cutting tool relative to and in engagement with said cast iron stock to remove a cast iron chip, said ceramic cutting tool being the densified and fused product of compacting and heating powder having as constituent ingredients about 4 to about 12% by weight $Y_2O_3$ and a balance (about 96 to about 88% by weight) consisting essentially of $Si_3N_4$ until said product has a density of at least 3.25 gms./cm³, a hardness level of at least 86 using the Rockwell 45-N standard and a physical strength as measured by the 4-point bend test of at least 70,000 psi at 700° C.

4. A process in accordance with claim 1, 2 or 3 wherein said ceramic cutting tool is produced by hot pressing a mixture of $Si_3N_4$ powder and $Y_2O_3$ powder at a predetermined pressure and at an ultimate pressing temperature of 1700°–1750° C. until a density of at least 3.25 gms./cm$^3$ is obtained and shaping the hot pressed ceramic into a cutting tool.

5. A process in accordance with claim 1, 2 or 3 wherein said ceramic cutting tool is produced by hot pressing a mixture of $Si_3N_4$ powder and $Y_2O_3$ powder at a pressure of about 3.8 to about 6.5 ksi for about 1 to about 8 hours until a density of at least 3.25 gms./cm$^3$ is obtained and shaping the hot pressed ceramic into a cutting tool.

6. A process in accordance with claim 1, 2 or 3 in which said machine cutting is carried out for 20 minutes at a mass removal rate exceeding 8.6 in.$^3$/min. with resulting tool wear not exceeding 0.01 inches with no evidence of thermal cracking.

7. A process in accordance with claim 1, 2 or 3 in which said machine cutting is carried out at conditions which exceed 1000 sfm, 0.1 inch depth of cut, 0.02 inch feed, and iron removal of 8.6 in.$^3$/min.

8. A process in accordance with claim 1, 2 or 3 wherein said ceramic contains between about 6 and about 10% by weight $Y_2O_3$.

9. A process in accordance with claim 1, 2 or 3 in which said ceramic cutting tool is produced by hot pressing a mixture of $Si_3N_4$ powder and $Y_2O_3$ powder at a pressure in the range of about 3 to about 7 ksi and at an ultimate pressing temperature in the range of 1650°–1775° C.

10. A process for maching cutting of cast iron stock with a shaped ceramic cutting tool, comprising moving said shaped ceramic cutting tool relative to and in engagement with said cast iron stock to remove a cast iron chip, said ceramic cutting tool being the densified and fused product of compacting and heating together about 4 to about 12% by weight $Y_2O_3$ with a balance (about 96 to about 88% by weight) consisting essentially of $Si_3N_4$ and containing $SiO_2$ until said product has a density of at least 3.25 gms./cm$^3$, said $SiO_2$ being present in an amount such that the $Y_2O_3/SiO_2$ weight ratio exceeds 1.60.

* * * * *